United States Patent

Seri et al.

[11] Patent Number: 5,943,428
[45] Date of Patent: Aug. 24, 1999

[54] ACCIDENT SOUND DETECTOR

[75] Inventors: Toshimitsu Seri; Makoto Koura, both of Nagasaki; Noboru Kyouno, Tokyo, all of Japan

[73] Assignee: Mitsubishi Electric Engineering Company, Ltd., Tokyo, Japan

[21] Appl. No.: 09/046,538

[22] Filed: Mar. 24, 1998

[30] Foreign Application Priority Data

Mar. 31, 1997 [JP] Japan ........................................ 9-80550

[51] Int. Cl.⁶ .................................................. H04R 29/00
[52] U.S. Cl. ............................................................ 381/56
[58] Field of Search ...................................... 381/56, 57, 58, 381/110, 120; 340/906

[56] References Cited

U.S. PATENT DOCUMENTS

| | | | |
|---|---|---|---|
| 4,319,081 | 3/1982 | Martin et al. | 381/56 |
| 5,365,219 | 11/1994 | Wong et al. | 381/56 |
| 5,784,007 | 7/1998 | Pepper | 340/906 |

FOREIGN PATENT DOCUMENTS

| | | |
|---|---|---|
| 4338900 | 11/1992 | Japan . |
| 9245825 | 9/1997 | Japan . |
| 101691 | 1/1998 | Japan . |

*Primary Examiner*—Vivian Chang
*Attorney, Agent, or Firm*—Leydig, Voit & Mayer, Ltd.

[57] ABSTRACT

An accident sound detector counts the number of records of detected accident sounds in a predetermined period of time. The accident sound detector varies the amplification of input sound signals according to the number of records or their variation to limit the number of records, thereby making it possible to increase the recording time of a recording medium without overwriting the records. The detector includes an amplifier for amplifying a sound signal from an ambient sound detector. An accident sound detector circuit and a record controller detect and record an accident sound by comparing an output value from the amplifier to a threshold. A counter circuit counts the number of detected signals of the accident sound detector circuit. A comparator compares the count value of the counter circuit with a reference count value. An amplification controller circuit controls the amplification of the amplifier based on output of the comparator.

5 Claims, 3 Drawing Sheets

ACCIDENT SOUND DETECTOR

BACKGROUND OF THE INVENTION

1. Field of the Invention

The present invention relates to an accident sound detector for efficiently detecting traffic accidents from accident sounds (including accident sounds such as crash sounds and the sound of hard braking leading to an accident) at an intersection.

2. Description of the Prior Art

Generally, traffic accidents frequently occur at intersections, a traffic accident situation recorder that records the conditions when a traffic accident occurs has already been contemplated.

FIG. 3 shows a block diagram of a conventional traffic accident situation recorder as disclosed in Japanese Patent Application Laid-Open No. 4-338900.

Referring to FIG. 3, traffic signals 1, 4; signal lamps 1B, 1Y, 1R, 4B, 4Y, 4R; signal lines 2B, 2Y, 2R; a signal flasher 3; a signal lamp symbol generator 5; a time-of-day character generator 6; an adder 7; an imaging device 8; an endless recorder 9; an ambient sound detector 10; a crash sound detector 11; a record controller 12; and magnetic record reproduction device 13 are shown.

Here, a section for detecting traffic sound is constituted by the ambient sound detector 10 and the crash sound detector 11. That is, the ambient sound detector 10 detects a sound signal, and sends it to the crash sound detector 11. The crash sound detector 11 determines whether or not the detected sound signal is that of a crash between vehicles, and sends a crash sound detection signal to the record controller 12 when it determines that the detected sound signal is a crash sound.

The crash sound detector 11 makes this determination by comparing the level of the input sound signal with a predetermined threshold, and determines that there has been an accident when the level exceeds the threshold. In addition, to prevent erroneous operation, a directional microphone is used for the ambient sound detector 10, and a band-pass filter is installed in the path of the sound signal.

The traffic sound detection section described in the above application determines a crash sound by comparing levels of a detected sound signal with a predetermined, fixed threshold. However, ordinary traffic sounds includes many loud sounds other than accident sounds such as hard braking sounds, horn sounds, the sound of road repair, the sound of opening or closing shutters of surrounding stores, and the sound of speeding motorcycles.

Thus, with the method that compares the levels of a detected sound signal and a fixed threshold, various traffic sounds, other than actual accident sounds, are also determined to be accident sounds, thereby increasing the number of records that are not accidents.

In addition, such determination significantly depends on the size of the intersection, traffic, types of passing vehicles, number of surrounding stores, or evenness of the road, which leads to large differences in the number of records per unit hour from one intersection to another.

However, since the period of time available for recording on the recording medium is usually limited with a conventional device, the recording medium is exhausted in a short period of time if the number of records increases, and an image of an accident might be overwritten by successive records, so that necessary information can not be obtained. In addition, there is a problem in that consumption of the recording medium where the device is installed varies from one intersection to another. For example, in the case of a one-car accident, the driver might leave without reporting the accident. In such a case, it becomes impossible to identify the vehicle that caused the accident because information on the vehicle cannot be obtained.

In addition, in the case where sounds higher than the threshold are frequently generated, such as the sounds of road excavation or the noise of jack-hammers due to road repairs around an installed intersection, many records occur on the recorder in a short period of time. This is a large factor that increases the number of records.

Furthermore, since the level of sound becomes lower as the sound becomes farther from its source, for some intersections there is a problem in that the threshold level needs to be adjusted to an optimum level according to the distance between the sound source and the ambient sound detector.

SUMMARY OF THE INVENTION

The present invention is made to overcome the above problems, and is intended to provide an accident sound detector which counts the number of records of detected accident sounds in a predetermined period of time, and varies amplification of input sound signals according to the number of records or their variation to limit the number of records, thereby making it possible to maintain recording on a recording medium for a predetermined duration or more without overwriting the records.

According to one aspect of the present invention, an accident sound detector installed at an intersection or road for detecting accident sound using a sound signal from an ambient sound detector comprises an amplifying means for amplifying a sound signal from the ambient sound detector, an accident sound detector means for comparing an output value of the amplifying means with a threshold to detect an accident sound and record the detected accident sound, a counter means for counting the number of records in a predetermined period of time at the accident sound detector means, and an amplification controller means for comparing the number of records on the counter means with a reference number of records, and controlling the amplification of the amplifying means according to the result of the comparison.

According to this arrangement, it is possible to eliminate sudden variations in the number of records through control of the amplifying means based on the number of records, whereby it becomes unnecessary to set a threshold for each intersection, and the recording medium can be continuously used for a predetermined duration or more without changing it, so that the labor for changing the recording medium can be reduced.

In one form of the invention, the accident sound detector means comprises an accident sound detector circuit for detecting an accident sound, and a record controller for recording a detected signal from the accident sound detector circuit; the counter means comprises a counter circuit for counting detected signals from the accident sound detector circuit, and a timer circuit for applying an output to the counter circuit at every predetermined period of time; and the amplification controller means comprises a reference signal generator, a comparator for comparing the reference from the reference signal generator with the count from the counter circuit, and an amplification controller circuit for controlling the amplification of the amplifying means based on output from the comparator.

DETAILED DESCRIPTION OF THE PREFERRED EMBODIMENTS

An embodiment of the present invention will now be described with reference to the drawings.

Figure 1:
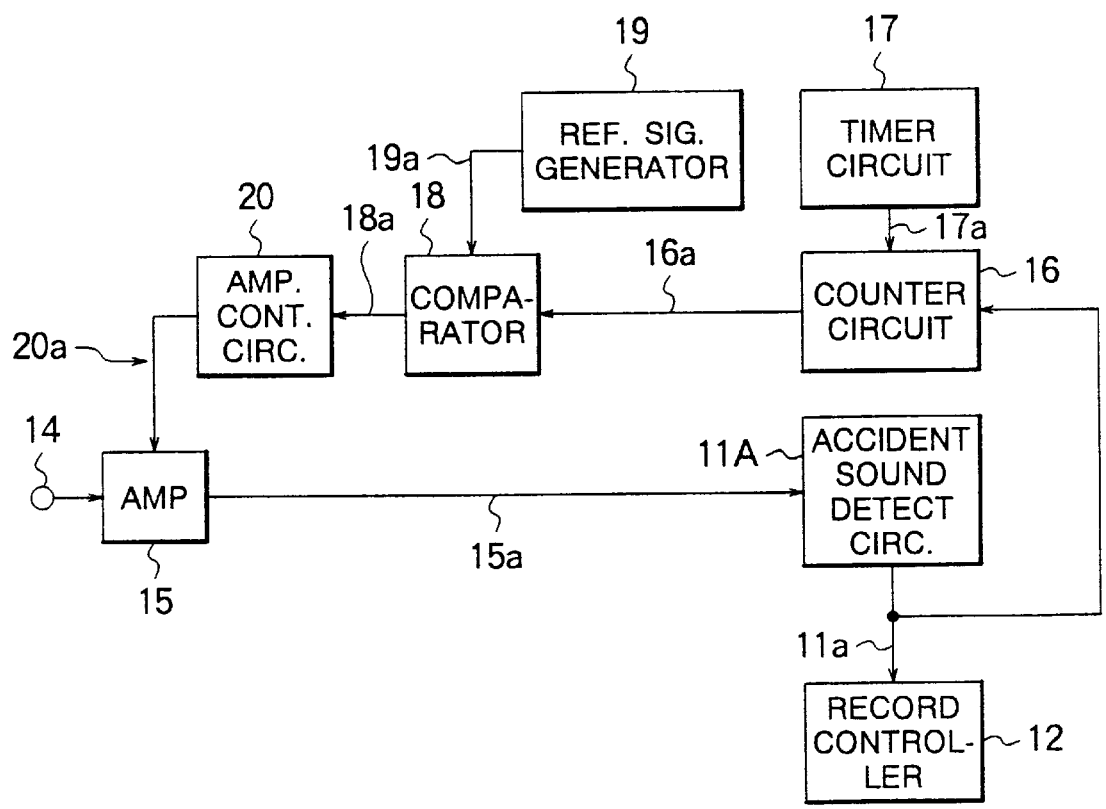
FIG. 1 is a block diagram showing a first embodiment of the present invention.
Figure 3:
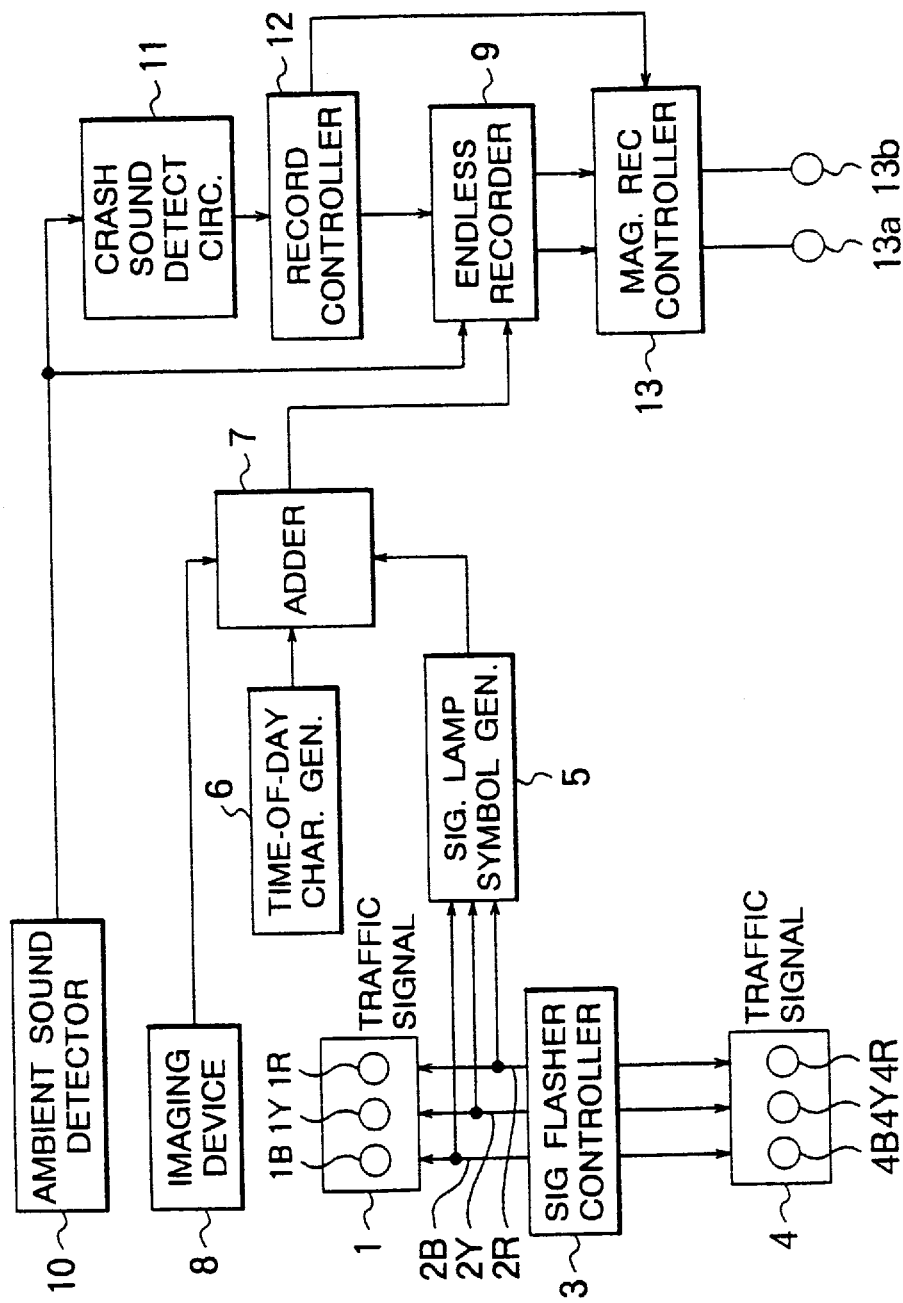
FIG. 3 is a block diagram showing a conventional traffic accident situation recorder.

FIG. 1 is a block diagram showing a first embodiment of the present invention. In the figure, the same reference numerals are used for the components that correspond to those in FIG. 3 and their detailed description is omitted.

Referring to the figure, a sound signal 14 is supplied from an ambient sound detector 10 (FIG. 3), an amplifier 15 as an amplifying means amplifies the sound signal 14, and an accident sound detector circuit 11A detects accident sound based on a sound signal 15a amplified by the amplifier 15. A record controller 12 records a signal detected from the accident sound detector circuit 11A, or a determination signal 11a output when sound is determined to be an accident sound.

Then, a counter circuit 16 counts the generated frequency of the determination signal 11a from the accident sound detector circuit 11A, that is, it counts the number of records in the record controller 12, and a timer circuit 17 measures time and outputs an output signal 17a to the counter circuit 16 at every predetermined period of time. Reference number 18 is a, comparator, and 19 is a reference signal generator 19 which previously sets a reference value (reference number of records) 19a. The comparator 18 compares a count 16a from the counter circuit 16 with the reference value 19a from the reference signal generator 19. An amplification controller circuit 20 generates an amplification control signal 20a based on the output signal 18a from the comparator 18 to control the stepwise amplification of the amplifier 15.

Here, the accident sound detector circuit 11A and the record controller 12 constitute the accident sound detector means; the counter circuit 16 and the timer circuit 17 constitute the counter means; and the comparator 18, the reference signal generator 19 and the amplification controller circuit 20 constitute the amplification controller means.

Next, the operation will be described with reference to FIG. 2.

When the ambient sound detector 10 supplies the sound signal 14 to the amplifier 15, the amplifier 15 amplifies the sound signal 14 by a predetermined amplification G1. The amplified sound signal 15a from the amplifier 15 is supplied to the accident sound detector circuit 11A where the determination of whether or not the sound is an accident sound is made. When, for example, in a comparison of the sound signal 15a and the predetermined threshold the sound signal 15a is determined to exceed the predetermined threshold, the accident sound detector circuit 11A determines that the sound is an accident sound.

Figure 2A:
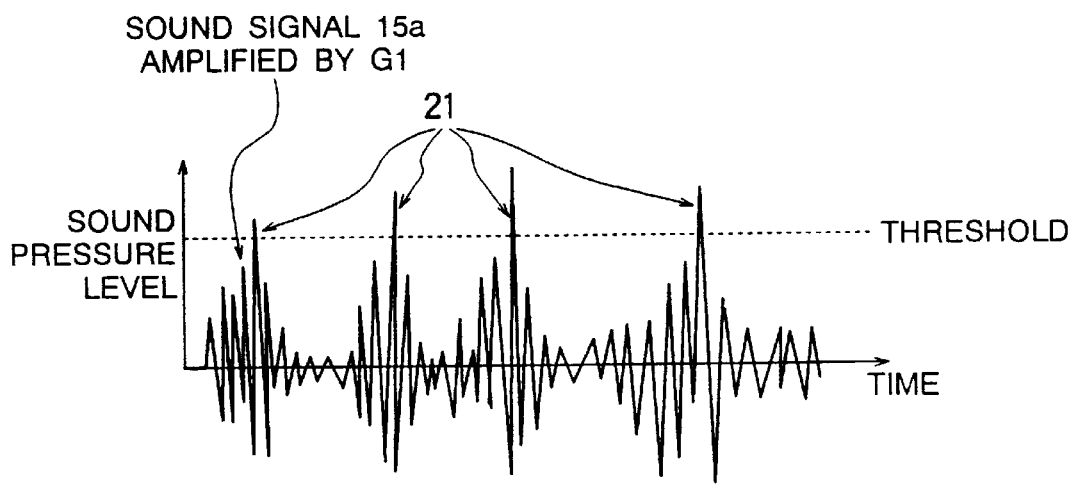
FIGS. 2a and 2b are signal waveforms used to explain the operation of FIG. 1.
Figure 2B:
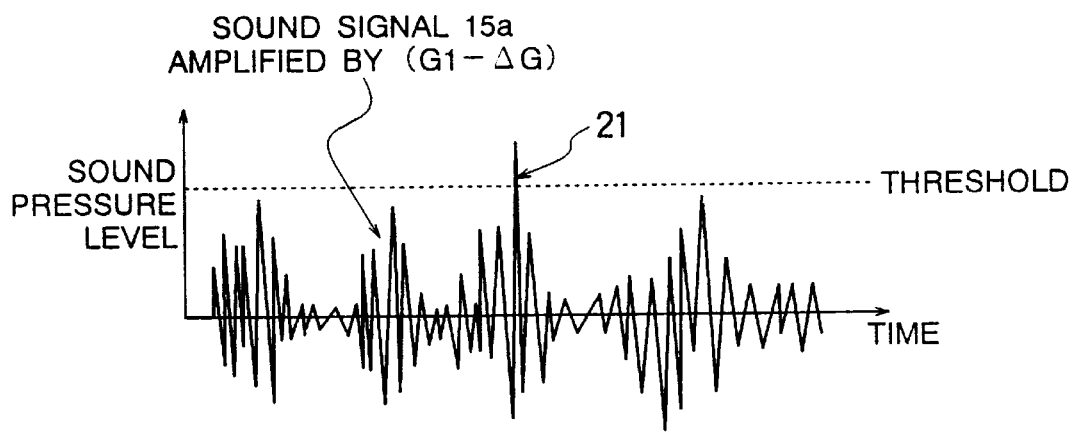

As shown in FIG. 2(a), for example, if the sound signal 14 being input is amplified by amplification g1 by the amplifier 15 and the amplified sound signal 15a exceeds the threshold at a timing indicated by reference 21, the accident sound detector circuit 11A outputs a detected signal or determination signal 11a which is in turn stored in the record controller 12.

To reduce false determinations, a plurality of frequency separation circuits may be provided at a stage after determination with a threshold to determine an accident from its component intensity in each band.

When the accident sound detector circuit 11A determines an accident sound, it sends the detected signal 11a to the record controller 12 and the counter circuit 16. The counter circuit 16 increments the counter value by one every time the detected signal 11a is input. The timer circuit 17 outputs an output signal 17a to the counter circuit 16 at each predetermined time t. The counter circuit 16 outputs a count value 16a to the comparator 18, and resets the count value to zero every time the output signal 17a is input from the timer circuit 17.

The comparator 18 compares the reference 19a from the reference signal generator 19 with the count value 16a every time the count value 16a is input and sends the result of the comparison to the amplification controller circuit 20. The amplification controller circuit 20 controls the stepwise amplification of the amplifier 15 according to the result of comparison 18a.

For example, when, as described above, the sound signal 15 amplified by the amplifier 15 exceeds the threshold and is output as a detected signal 11a and stored in the record controller 12, and the number of records in a period of time t1 is N, the comparator 18 compares the reference M with the count value N, which is the above-mentioned number of records, and outputs an output signal 18a if N>M. The amplification controller circuit 20 generates an amplification control signal 20a based on the output signal 18a, and causes the amplifier 15 to lower its amplification G1 by the variation $\Delta G$.

Consequently, a sound signal 14a input after execution of the control would be amplified with amplification (G1–$\Delta G$) by the amplifier 15. When a sound signal attains the same level as that of the sound signal in the previous period of time, it attains the level shown in FIG. 2(b), so that the amount of sound exceeding the threshold decreases. Therefore, the record controller 12 records a smaller number of records. The variation $\Delta G$ is predetermined and the larger the variation $\Delta G$ is, the more significantly the amplification varies. Then, the number of records varies accordingly.

In addition, without the number of records decreasing much at that moment, and the number of records again exceeding the reference in the next period of time t2, the amplification would be further lowered by the variation $\Delta G$. In such a way, it is possible to suppress a sudden increase of the number of records due to unnecessary sound as the operation is repeatedly performed. The shorter the period of time t, the better a sudden increase of the number of records can be accommodated.

It may also be possible with this device to set the reference in the reference signal generator 19 in a range such as from the upper limit MU to the lower limit MB, and to lower the amplification if the number of records exceeds the upper limit MU, and to increase the amplification if the number of records is below the lower limit MB, whereby the number of records can be kept in the range of reference from MU to MB.

As described, since the embodiment is arranged to detect accident sounds using a sound signal from the ambient sound detector installed at an intersection or road to record an image and/or sound of the accident on the recording medium, to compare a count value counted over a predetermined period of time or predetermined number of days and a predetermined reference, and to automatically vary amplification of the input sound signal according to the difference, setting a threshold for each intersection becomes unnecessary, and the recording medium can be continuously used for a predetermined duration or more without changing it, so that the labor for exchanging the recording medium can be reduced.

What is claimed is:

1. An accident sound detector and recorder for detecting and recording accident sounds based on sound signals detected by an ambient sound detector installed near a road, the accident sound detector comprising:

amplifying means for amplifying sound signals detected by an ambient sound detector installed near a road to produce amplified sound signals, sound-threshold-exceeded detecting and recording means for comparing the amplified sound signals output from said amplifying means with a threshold to detect whether the amplified sound signals exceed the threshold, for outputting the amplified sound signals as sound-threshold-exceeded detection signals when the amplified sound signals exceed the threshold, and for recording the sound-threshold-exceeded detection signals as records, counter means for counting records recorded in a first period of time by said sound-threshold-exceeded detecting and recording means as a record count, and amplification controller means for comparing the record count counted by said counter means within the first period of time with a reference number of records and producing a record-count-exceeded signal when the record count exceeds the reference number, and controlling gain of said amplifying means according to the record-count-exceeded signal.

2. The accident sound detector and recorder as set forth in claim 1, wherein:

said sound-threshold-exceeded detecting and recording means comprises:

a sound-threshold-exceeded detector circuit for detecting whether the amplified sound signals exceed the threshold and outputting the sound-threshold-exceeded detection signals when the amplified sound signals exceed the threshold, and a record controller for recording the sound-threshold-exceeded detection signals output from said sound-threshold-exceeded detector circuit as records;

said counter means comprises:

a counter circuit for counting the sound-threshold-exceeded detection signals output from said sound-threshold-exceeded detector circuit to determine and output the record count, and a timer circuit for applying an output signal to said counter circuit at expiration of each first period of time; and said amplification controller means comprises:

a reference signal generator for generating a reference count value, a comparator for comparing the reference count value from said reference signal generator with the record count output from said counter circuit and producing the record-count-exceeded signal when the reference count value exceeds the record count output from said counter circuit, and an amplification controller circuit for controlling the gain of said amplifying means based on the record-count-exceeded signal output from said comparator.

3. The accident sound detector and recorder as claimed in claim 2, wherein said reference signal generator generates a first reference count value and a second reference count value higher than the first reference count value and said comparator compares the record count output from said counter circuit with the first and second reference count values and produces an out-of-range signal when the record count output from said counter circuit is less than the first reference count value or greater than the second reference count value, and said amplification controller circuit controls the gain of said amplifying means based on the out-of-range signal output from said comparator.

4. The accident sound detector and recorder as claimed in claim 2, wherein said amplification controller circuit reduces the gain of said amplifying means in response to the record-count-exceeded signal produced by said comparator.

5. The accident sound detector and recorder as claimed in claim 1, wherein said amplification controller means reduces the gain of said amplifying means in response to the record-count-exceeded signal.

* * * * *